(12) United States Patent
Carrier et al.

(10) Patent No.: US 9,430,464 B2
(45) Date of Patent: Aug. 30, 2016

(54) IDENTIFYING UNCHECKED CRITERIA IN UNSTRUCTURED AND SEMI-STRUCTURED DATA

(71) Applicant: International Business Machines Corporation, Armonk, NY (US)

(72) Inventors: Scott R. Carrier, Apex, NC (US); Elena Romanova, Minsk (BY); Marie L. Setnes, Bloomington, MN (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/136,314

(22) Filed: Dec. 20, 2013

(65) Prior Publication Data

US 2015/0178345 A1    Jun. 25, 2015

(51) Int. Cl.
*G06F 17/30* (2006.01)
*G06F 17/28* (2006.01)

(52) U.S. Cl.
CPC ......... *G06F 17/28* (2013.01); *G06F 17/30371* (2013.01); *G06F 17/30705* (2013.01); *G06F 17/30941* (2013.01)

(58) Field of Classification Search
CPC ...................... G06F 17/30371; G06F 11/3452
USPC .................................................. 707/691, 688
See application file for complete search history.

(56) References Cited

U.S. PATENT DOCUMENTS

| | | | |
|---|---|---|---|
| 6,311,191 B1 * | 10/2001 | Retallick | G06Q 10/04 |
| 7,174,507 B2 * | 2/2007 | Baudin | G06F 17/30616 |
| | | | 707/E17.058 |
| 7,426,496 B2 | 9/2008 | Kristjansson | |
| 8,370,387 B2 | 2/2013 | Ebaugh et al. | |
| 8,756,234 B1 * | 6/2014 | Dreyer | 707/739 |
| 8,868,506 B1 * | 10/2014 | Bhargava | G06F 17/30011 |
| | | | 707/648 |
| 2006/0265253 A1 * | 11/2006 | Rao | G06Q 19/321 |
| | | | 705/3 |
| 2007/0100823 A1 * | 5/2007 | Inmon | G06F 17/30672 |
| 2007/0130134 A1 | 6/2007 | Ramsey et al. | |
| 2008/0256128 A1 * | 10/2008 | Pierce | G06F 19/363 |
| 2009/0217149 A1 | 8/2009 | Kamien et al. | |
| 2013/0054695 A1 * | 2/2013 | Holman | G09B 19/00 |
| | | | 709/204 |
| 2014/0156628 A1 * | 6/2014 | Raichelgauz | G06F 17/30864 |
| | | | 707/709 |

OTHER PUBLICATIONS

Wei et al., Integration of Structured and Unstructured Text Data in a Clinical Information System, 2006, 17 pages.*

(Continued)

*Primary Examiner* — Noosha Arjomandi
(74) *Attorney, Agent, or Firm* — Terrile, Cannatti, Chambers & Holland, LLP; Stephen A. Terrile (57) ABSTRACT

A method, system and computer-usable medium are disclosed for identifying unchecked criteria in unstructured and semi-structured data within a form. Text spans representing unchecked criteria within unstructured text in a form are detected and classified to facilitate accurate interpretation of the text. Section identification and annotation operations are then performed to identify and categorize sections within the form. Checklist sections within the form, along with associated checkmarks and boxes, are then identified, followed by the identification of checked item, criteria scope, and previously undetected checklist sections. Once all checklist sections and checked criteria have been identified, remaining text spans within a checklist section are annotated as unchecked criteria.

14 Claims, 5 Drawing Sheets

(56) References Cited

OTHER PUBLICATIONS ip.com, IBM, An general method to capture change of unstructured data within multiple Content Management System, Mar. 11, 2009.
Sokol, L. et al., Analytics in a Big Data Environment, 2012.
International Search Report and Written Opinion of the International Searching Authority for PCT Application No. PCT/JP2014/005307 dated Nov. 18, 2014.
S. Hamada, IBM, Provision, Research: What Defines Big Data Values, Summer 2013, No. 78, Jul. 30, 2013, pp. 46-51.
Y. Kagawa et al., Extraction of Dependent Relationships Among Question and Answers in Community QA, The 5th Forum on Data Engineering and Information Management [online], The Institute of Electronics, Information and Communication Engineers, The Database Society of Japan, Information Processing Society of Japan, May 31, 2013, http://db-event.jpn.org/deim2013/proceedings/pdf/b6-2.pdf.
T. Kawai, Ryukoku University, Proceedings of the Thirteenth Annual Meeting of the Association for Natural Language Processing, Mar. 19, 2007, pp. 566-569.
ip.com, IBM, Autocompletion Semi-Structured Documents Based on a Learned Set, Jun. 2, 2008.
ip.com, IBM, Using Proximity Based Classification and Presentation of Selection Options in Forms, May 18, 2010.
R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
Anthem, Blue Cross and Blue Shield Association, Medical Policy, http://www.anthem.com/medicalpolicies/policies/mp_pw_a050280.htm, Oct. 8, 2013.

\* cited by examiner

From: [Person] Date: 5/8/2012 10:57:58 AM
Call-back Number: [Phone Number]
Total pages: 9
Please check all that apply to the individual:

300

| | |
|---|---|
| 302 | Request is for the Invasive (inserted at the time of surgery) method of electrical bone growth simulation (EBGS) |
| 304 | Request is for the Noninvasive (beginning at any time from the time of surgery until up to 6 months of surgery) method of electrical bone growth stimulation (EBGS) |
| 306 | Request is for the Semi-Invasive method of electrical bone growth stimulation (EBGS) |
| 308 | X Request is for Invasive or Noninvasive electrical bone growth stimulation for spinal fusion surgery for an individual with a high risk for pseudoarthrosis (check all that apply): 322<br>One or more previous failed spinal fusion(s)<br>X Grade III or worse spondylolisthesis<br>X Fusion to be performed at more than one level — 324<br>History of tobacco use or alcoholism<br>Diabetes<br>Renal disease<br>Other metabolic disease where bone healing is likely to be compromised or growth is poor (please list disease): _________<br>Nutritional deficiency<br>Obese individual with a Body Mass Index (BMI) greater than 30 or weighs greater than 50% over his or her ideal body weight (IBW)*<br>Individual Height: _________<br>Individual Weight: _________<br>Severe anemia<br>Steroid therapy<br>Other (please list): _________  316 |
| 310 | Request is for Noninvasive EBGS for individual with failed spinal fusion (check all that apply):<br>A minimum of 6 months has passed since date of original surgery<br>Serial x-rays or appropriate imaging studies confirm there is no evidence of progression of healing for 3 months during the latter portion of the 6 month period.<br>Other (please list): _________  318 |
| 312 | Request is for treatment of fracture nonunions or congenital pseudoarthroses of long or short bones of the appendicular skeleton (check all that apply)<br>At least 45 days have passed since date of fracture of the date of surgical treatment of fracture<br>Serial radiographs or appropriate imaging studies confirm no progressive signs of healing have occurred<br>Fracture gap is less than on centimeter<br>Other:<br>Request is for treatment of joint fusion secondary to failed arthrodesis of the ankle or knee<br>Request is for noninvasive treatment of individual with synovial pseudoarthroses or draining osteomyelitis<br>Request is for treatment as an adjunct (i.e., at the time of or immediately after) to a bunionectomy procedure  320 |

*FIGURE 3*

From: [Person] Date: 5/8/2012 10:57:58 AM
Call-back Number: [Phone Number]
Total pages: 9

400

Please check all that apply to the individual:

402 — Request is for the Invasive (inserted at the time of surgery) method of electrical bone growth simulation (EBGS)
Request is for the Noninvasive (beginning at any time from the time of surgery until up to 6 months of surgery) method of electrical bone growth stimulation (EBGS)
Request is for the Semi-Invasive method of electrical bone growth stimulation (EBGS)

404 — X Request is for Invasive or Noninvasive electrical bone growth stimulation for spinal fusion surgery for an individual with a high risk for pseudoarthrosis (check all that apply):

One or more previous failed spinal fusion(s)
Grade III or worse spondylolisthesis
406 — X Fusion to be performed at more than one level
408 — X History of tobacco use or alcoholism
410 — Diabetes
Renal disease
Other metabolic disease where bone healing is likely to be compromised or growth is poor (please list disease): ______
Nutritional deficiency
Obese individual with a Body Mass Index (BMI) greater than 30 or weighs greater than 50% over his or her ideal body weight (IBW)*
Individual Height: ______
Individual Weight: ______
Severe anemia
Steroid therapy
Other (please list): ______

412 — Request is for Noninvasive EBGS for individual with failed spinal fusion (check all that apply):
A minimum of 6 months has passed since date of original surgery
Serial x-rays or appropriate imaging studies confirm there is no evidence of progression of healing for 3 months during the latter portion of the 6 month period.
Other (please list): ______

414 — Request is for treatment of fracture nonunions or congenital pseudoarthroses of long or short bones of the appendicular skeleton (check all that apply)
At least 45 days have passed since date of fracture of the date of surgical treatment of fracture
Serial radiographs or appropriate imaging studies confirm no progressive signs of healing have occurred
Fracture gap is less than on centimeter Other:
Request is for treatment of joint fusion secondary to failed arthrodesis of the ankle or knee
Request is for noninvasive treatment of individual with synovial pseudoarthroses or draining osteomyelitis
Request is for treatment as an adjunct (i.e., at the time of or immediately after) to a bunionectomy procedure

IDENTIFYING UNCHECKED CRITERIA IN UNSTRUCTURED AND SEMI-STRUCTURED DATA

BACKGROUND OF THE INVENTION

1. Field of the Invention

The present invention relates in general to the field of computers and similar technologies, and in particular to software utilized in this field. Still more particularly, it relates to a method, system and computer-usable medium for identifying unchecked criteria in unstructured and semi-structured data within a form.

2. Description of the Related Art

Paper-based forms, and their electronic equivalents, are commonly used by government, commercial and private entities alike to collect a wide variety of information. While individual forms may be unique, they typically include a variety of questions that have associated checkboxes that can be marked in various ways, blank fields to be populated with input data, or a combination of both. As with the collection of any kind of information, certain types, formats, or ranges of information are expected for certain fields. For example, a form used for tracking a delivery may include fields for "arrival date" and "arrival time," which would be respectively completed with a valid date and time of day.

Likewise, it is expected that certain rules or guidelines need to be adhered to when completing a form. If the rules are followed properly, then all pertinent checkboxes are marked, blank fields are appropriately populated, and complete and accurate information can be collected from the form. However, it's not uncommon for a person to inadvertently fail to complete a form for any number of reasons. For example, it may be unclear that certain checkboxes or fields are associated with a particular question on the form. As another example, the person may simply have not understood that one or more checkboxes must be marked or that certain blank fields must be filled out. As yet another example, the form may even have sections of text that includes questions that have no obvious checkboxes or blank fields. It will be appreciated that many hours or even days may have passed by the time these omissions are discovered, making it difficult to collect all of the information needed to properly provide associated goods or services.

These issues are often exacerbated by the fact that checklist form data may be multi-dimensional. That is, some text may be checked and some may not. Furthermore, text criteria spans that are checked may need to be handled differently than those that are unchecked. Moreover, they typically need to be handled differently when processed by a knowledge-based system, such as Watson™, available from International Business Machines (IBM™). For example, it may not be desirable to have text alignment, term/n-gram matchers factoring in unchecked text spans. Yet at the same time, the text cannot be simply ignored either, as it may signify a negation or otherwise contribute to identifying the correct or best answer to a question in the form.

SUMMARY OF THE INVENTION

A method, system and computer-usable medium are disclosed for identifying unchecked criteria in unstructured and semi-structured data within a form. In various embodiments, text spans representing unchecked criteria within unstructured or semi-structured text in a form are detected and classified to facilitate accurate interpretation of the text. In these embodiments, section identification and annotation operations are performed to identify and categorize sections within a target form.

Checklist sections within the target form are then identified by performing operations to identify trigger terms or phrases, such as "check all that apply" in the header of each checklist section. Concurrently, associated checkmarks and boxes (e.g., "_X_", "_x", "X", "_", graphical images, etc.) are identified, followed by the identification of checked item, criteria scope, and previously undetected checklist sections that lack checklist triggers in their associated checklist headers.

In various embodiments, a document section that had been previously identified as a non-checklist section is re-categorized as a checklist section when predetermined conditions are observed. In one embodiment, a non-checklist section is re-categorized as a checklist section if it contains a checkmark or box. In another embodiment, a previously-identified non-checklist section is combined with an identified checklist section when there is a relatively small space separating the two. Once all checklist sections and checked criteria have been identified, remaining text spans within a checklist section are annotated as unchecked criteria.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows Natural Language Processing (NLP) text that has been processed to identify various sections of a populated form;

FIG. 4 shows unchecked criteria that have been identified within the populated form of FIG. 3.

DETAILED DESCRIPTION

A method, system and computer-usable medium are disclosed for identifying unchecked criteria in unstructured and semi-structured data within a form. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer]

diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
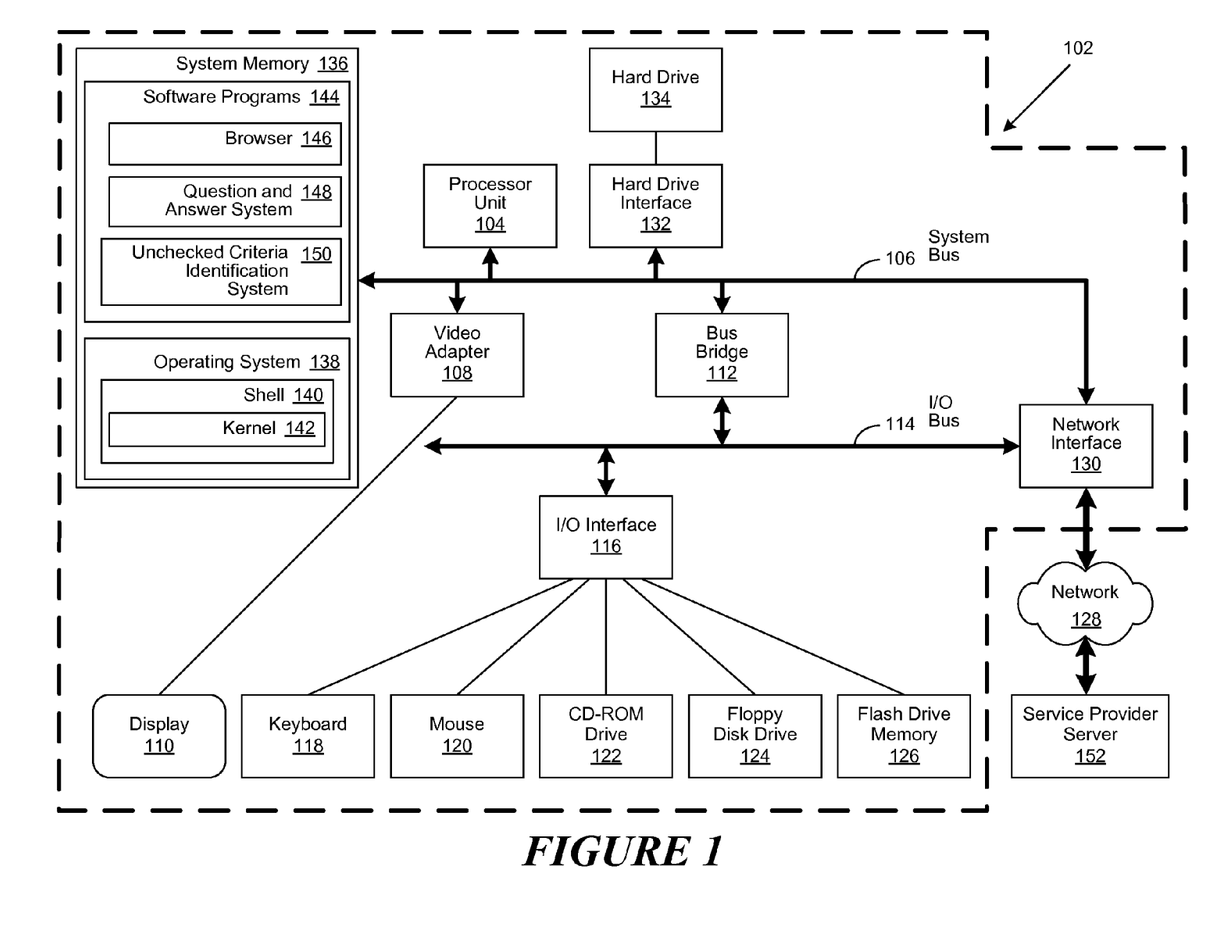
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and a Question and Answer (QA) system 148, described in greater detail herein. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include an unchecked criteria identification system 150. In these and other embodiments, the unchecked criteria identification system 150 includes code for implementing the processes described hereinbelow. In one embodiment, client computer 102 is able to download the unchecked criteria identification system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

In various embodiments, the QA system 148 is trained to identify unchecked criteria in unstructured and semi-structured data within a form. In certain embodiments, the QA system 148 may be the Watson™ QA system 148 available from International Business Machines Corporation of Armonk, N.Y. In these embodiments, the Watson™ QA system 148 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system 148 then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system 148. The statistical model may then be used to summarize a level of confidence that the Watson™ QA system 148 has regarding the evidence that the potential response, i.e. candidate answer, is inferred by the question. This process may be repeated for each of the candidate answers until the Watson™ QA system 148 identifies candidate answers that surface as being significantly stronger than others and thus, generates a final answer, or ranked set of answers, for the input question. More information about the Watson™ QA system 148 may be obtained, for example, from the IBM Corporation website, IBM Redbooks, and the like. For example, information about the Watson™ QA system 148 can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 2:
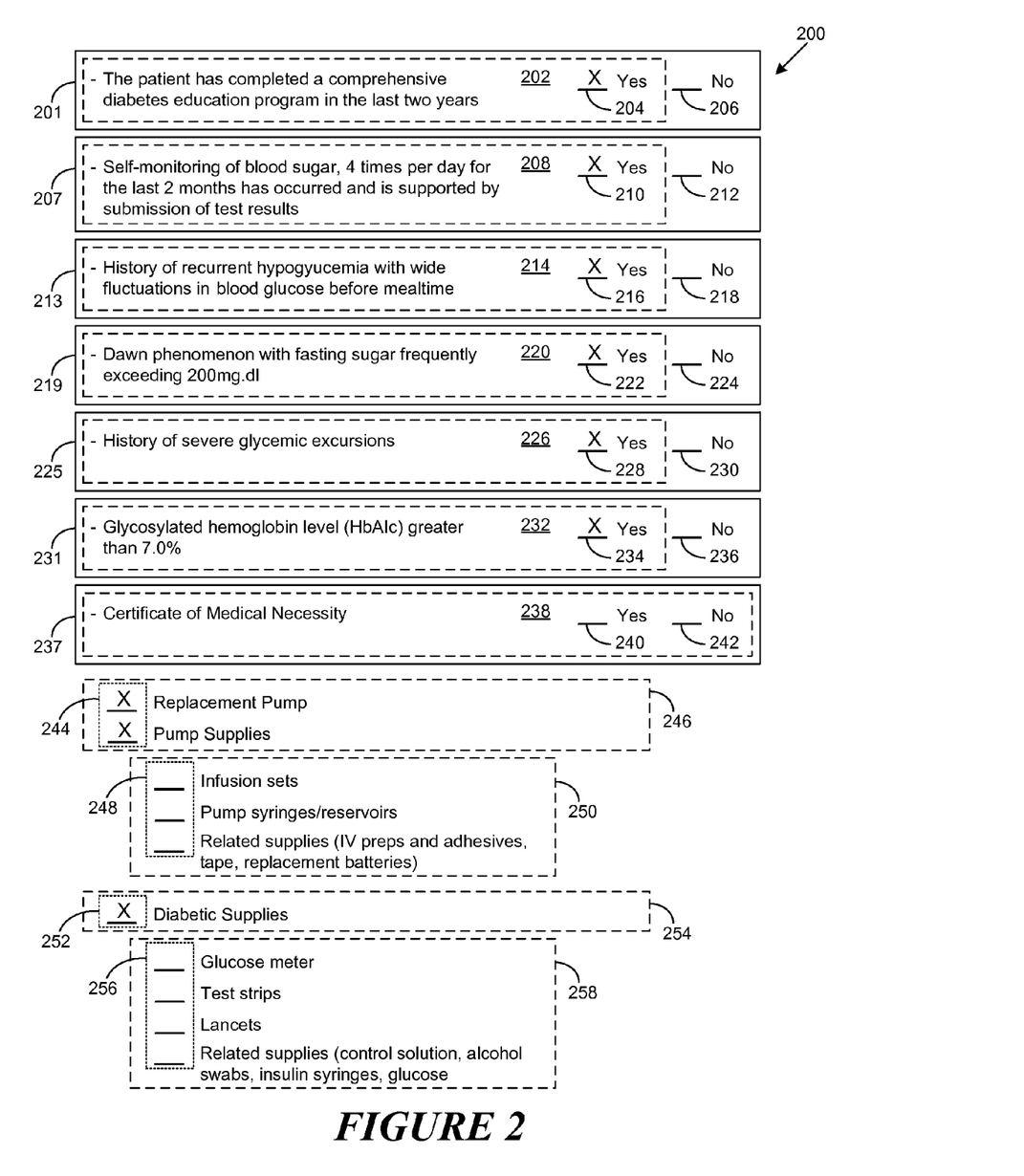
FIG. 2 shows the identification of unchecked criteria within a form.

FIG. 2 shows the identification of unchecked criteria within a form implemented in accordance with an embodiment of the invention. In various embodiments, a Question and Answer (QA) system, such as the Watson™ QA system available from International Business Machines Corporation of Armonk, N.Y., is trained to answer questions based on real-world, form-based input commonly used in domains such as the medical industry.

Skilled practitioners of the art will recognize that text identified as unchecked criteria within such form-based input serves many functions within QA systems such as Watson™ QA system available from International Business Machines Corporation of Armonk, N.Y. For example, unchecked criteria can be omitted from Natural Language Processing (NLP) scorers such as text alignment, n-gram, etc. to prevent false positives. Alternately, unchecked criteria can be rewritten to embody its context as unchecked, thus making it suitable for NLP scorers such as text alignment, n-gram etc. To further the example, if "_Diabetes" is unchecked in a form identifying the medical conditions of the patient, a statement such as "The patient does not have diabetes." can be generated for consumption by NLP scorers.

Conversely, checked or unchecked criteria can interchangeably represent positive or negative statements according to the context of the form. Using the diabetes example, if the form header read "Patient does not have any of the following criteria:", then an unchecked "_Diabetes" would be an indicator that the patient has diabetes (i.e., a positive condition). Optionally, functions such as machine learning or other statistical models can be employed to identify which scorers best interpret or employ the unchecked criteria to arrive at the best correct answer. In several projects, QA systems such as Watson answer an implicit question of whether or not a patient meets eligibility criteria defined for clinical trials, insurance guidelines, etc. It will be appreciated that simply ignoring unchecked criteria or assuming all concepts therein are negated is may result in insufficient or incorrect results when processing form-based input.

In various embodiments, text spans representing unchecked criteria within unstructured or semi-structured text within a form are detected and classified to facilitate accurate interpretation of the text. As used herein, unchecked criteria broadly refers to a discrete item within a structured, semi-structured, or unstructured text, such as a printed or electronic form, that represents an explicit or implied question lacking a response.

In these embodiments, checkmarks are detected in a variety of forms (e.g., "_x," "X," "1," "xSomeWord," etc.) which appears before or after anchor text. In various embodiments the checkmarks may denote Boolean or multi-value attributes of the anchor text. For example, "X" Request is for procedure XYZ, patient has a history of high blood pressure? "X Yes_ No," physical exam palpitations: "_Spleen, _X_ Liver, _Lymph Nodes," and so forth. In certain embodiments, inference of a checkmark association is determined via edge checkmark structure within a document or proximity to term attribute in the absence of a check box indicator. For example, "X Spleen Liver Lymph Nodes," where spleen is checked and such checkmarks appear to the left of the term, or "Spleen Liver X Lymph nodes," where it is detected that 'X' is closer to Lymph Nodes than the other choices.

In various embodiments, checklist sections are detected both with and without "check" term indicators. In these embodiments, inferencing of non-obvious checklist sections is accomplished by determining the proximity to other checklist sections and detection of check marks outside of checklist sections. In certain embodiments, unchecked criteria absent any checkbox or unchecked indicators are detected when checklist sections minus checked criteria surfaces the unchecked criteria. In certain embodiments, multi-sentence checked criteria are detected via continuation of semantic theme or sentence structure within section.

In various embodiments, target text is processed using Natural Language Processing (NLP) approaches familiar to skilled practitioners of the art to partition the text into groups of conceptually-related content. One known branch of NLP pertains to transforming a given content into a human usable language or form that facilitates the exchange of information between humans and data processing systems. For example, NLP can accept a document whose content is in a computer-specific language or form, and produce a document whose corresponding content is in a human-readable form. In various embodiments, groups of conceptually-related content, also referred to herein as concept groups, typically contain contiguous portions of text. In certain embodiments, the concept groups represent section headers associated with one or more other concept groups. In various embodiments, the headers may be implemented to organize data into various cells into headings, categories, or classifications (categories). The headers are implemented as row-headers. In certain embodiments, the headers are not limited to boundaries or extremities. In various embodiments, a header is implemented in the form of a sub-header, for example, to identify a sub-category of data. However, these concept groups are not necessarily limited to such and may in fact identify related portions of text regardless of the existence or non-existence of section headers.

For example, when there are no obvious section headings in the textual content, a change of subject or topic can still be detected in various embodiments due to the difference in affinity of concept groups. For example, a portion of text describing drugs and various types of cancer would contain particular semantic concepts, whereas a text about zoological gardens would contain references to animals, and natural habitats, etc., which are different semantic concepts from the portion of text describing drugs and cancer types. Changes in such concept groupings are identified in various embodiments to identify related portions of text whether or not these portions of text have associated section headers. In certain embodiments, section headers may be inferred based upon concepts identified in the portions of text.

In various embodiments, related concepts are grouped together into concept groups, to distinguish between portions of text associated with these concept groups, even within the same contiguous portion of text, in order to split the portions of text into separate sections without any structural clues. In machine learning terms, such clues contained in a set of all possible supporting clues is called a "feature." Presence or absence of a feature for an existing hypothesis increases or decreases the confidence level in that hypothesis. In one embodiment, a "model" is an approach to computing the confidence score for a hypothesis based on a subset of features that are present, or support, the hypothesis. In another embodiment, the model operates as a rule-based engine. In yet another embodiment, the model is 'trainable' by using a training set of tables for which confidence score is known a priori (i.e., a "labeled set").

In certain embodiments, these groupings or clusters of concepts within the textual content may be recognized using an existing knowledge base. In these embodiments, labels may be assigned to the various resulting sections of text in the output metadata for the portion of content (e.g., a document or the like). In addition, as a result of groupings or clusters of concepts being identified within the portion of content, those pieces of the portion of content that are not part of the groupings or clusters and thus, not related, can be identified. It will be appreciated that these abilities would be helpful in assisting with textual content processing, such as by a text search system, QA system, or other information extraction system.

In certain embodiments, a section of text within the textual content, (e.g., documents or other portions of text) is identified as a section heading in the content being processed and is associated with the remaining text in the content. Skilled practitioners of the art will recognize that the identification of a section heading may be done in many ways, including identifying the section heading as a sentence containing a single word, or a small number of words less than a predetermined threshold number of words, followed by a line break. A colon character, or other special character, appended to this sentence is taken as additional evidence to indicate that the word or phrase is a section heading. The paragraph(s) of text immediately following the identified section heading are then understood to be the related body of text. Other, more sophisticated, approaches to identifying section headers and corresponding text may use statistical methods or pattern rules based on known section heading keywords and formatting characters.

It will likewise be appreciated that certain challenges exist in determining the boundary of the text associated with the particular section heading (i.e., the related section text). One approach is to identify the related section text as the text appearing immediately after a section header and continuing until the end of the paragraph is encountered or until a next section header is encountered in the text of the content. Such approaches often misrepresent the subject matter of the section content, as there may be several sets of subject specific content within a single paragraph or portion of text appearing between section headers. Moreover, in approaches where related text is assumed to be immediately subsequent to the section header and continues until a new section header is encountered, a difficulty may arise when there is no other section headers in the document. Thus, subsequent paragraphs or portions of text may not have an explicit semantic link to the most recent section header. Moreover, in some cases a section can end with a single line, a character, or the like, that makes that portion of text appear to be another section header when it is not intended to be one.

In various embodiments, the preceding issues are addressed by linking text following a particular section header (or section heading) only if there is a semantic link to that section header. For example, in the medical domain, the Logic Observation Identifiers Names and Codes (LOINC) are used to identify particular sections in a patient's medical history record document. These codes can greatly facilitate ensuring accurate automated analysis of the patient's case or in determining appropriate treatment. However, determining the most appropriate LOINC code to be applied to a section can prove difficult when there are no obvious indications of section delimiters from the structure or format of the document. In such cases, the content of the text itself must be analyzed for named entities related to particular section types. There are many ways in which these named entities can be considered to indicate a particular section or LOINC code. An example of this is the order in which these named entities, or ordered clusters of such entities, appear in the text.

In certain embodiments, concept affinities are based upon semantic interaction of concepts with each other. Such concept affinities may be affinities between identified concepts in textual content and proposed section headings or semantic categories or subject matter, affinities between individual concepts for clustering of related entities, affinities between sets of clusters of concepts to thereby distinguish related and unrelated portions of text, and the like. In various embodiments, the concept affinities are identified within the context of the structural elements of the portion of content, where the portion of content may be in the form of documents, portions of text, web pages, scanned-in documents, or the like (referred to hereafter collectively as simply "documents").

In various embodiments, document sections, including headings, contain discussions on topics which are described by a set of interacting and strongly related concepts. For example, a "Medications" section may contain mentions of concepts of type "Drug," and a mention of a type of "Drug" may be contained in a section following a heading "Medications." Likewise, it is likely that concepts of the type "Dosage," "Route," "Frequency," and "Adverse Drug Reaction" will also be mentioned in the sentences which make up that section. Linked groups of concepts or topics often are indicative of a section in a document whether or not a section heading is present. In certain embodiments, the foregoing is used to score portions of a document in order to determine section boundaries and associate these sections with corresponding section headings, if such section headings are present, or with proposed section headings in some illustrative embodiments.

In certain embodiments, potential sections of a document are identified based upon topic or concept groupings and a scoring methodology when it is processed. In these embodiments, the identification of potential sections and the scoring methodology may be applied to determine the affinity of sections to each other and to existing or proposed (i.e., inferred) section headings. These section headings are generated based upon the result of semantic content concept grouping or clustering at each granularity level (e.g., word, sentence, paragraph, or the like). The affinity of each section to an actual or inferred section heading and to each other is then calculated. Overlapping sections are possible and the final section assignment and selection is based on choosing the highest scoring section heading, section text and section text pairs that cover the document in a non-overlapping manner.

Accordingly, various embodiments do not depend upon structure delimiters, such as paragraph breaks, special characters, or the like, to link sections of text with each other or sections of text with corresponding section headers, actual or inferred. Instead, the textual content is analyzed to identify concepts within the section text and any actual or inferred section headers based on ontologies, semantic networks, and other knowledge bases. The resulting section texts are then correlated with one another and with the section headings, inferred or otherwise, so as to generate metadata (e.g., annotations) that link sections of text with each other and/or corresponding actual or inferred section headings, general semantic categories, or the like. In these embodiments, the correlations are based on relatedness of concept groups or clusters, which gives a strong indicator of semantic affinity. The scoring mechanisms of these embodiments provide a manner by which such affinities may be quantified and used as a basis for selecting section assignments for annotating documents for use with analytical mechanisms, such as natural language processing (NLP) systems, Question and Answer (QA) systems, or the like.

Referring now to FIG. 2, section identification and annotation operations, described in greater detail herein, are performed to identify and categorize sections within a target text, such as a populated form 200. As shown in FIG. 2, these operations have resulted in the identification of question sections 201, 207, 213, 219, 225, 231 and 237. One or more checklist sections 244, 248, 252 and 256 are then identified within the populated form 200 by performing operations described in greater detail herein. Concurrently, associated checkmarks (e.g., "_X_", "_x", "X", "_", graphical images, etc.) 204, 210, 216, 222, 228, 234, 244 and 252 are identified by performing operations described in greater detail herein. Likewise, checkmarks are identified as being absent from checkboxes 206, 212, 218, 224, 230, 236, 240 and 242. As shown in FIG. 2, checkmarks 204, 210, 216, 222, 228 and 234 are likewise identified as being respectively associated with unchecked checkboxes 206, 212, 218, 224, 230 and 236. Likewise unchecked checkboxes 240 and 242 are identified as being associated with one another. Thereafter, operations are performed to identify checked item and criteria scope as described in greater detail herein.

Once all checklist sections and checked criteria have been identified, remaining text spans within a checklist section are annotated as unchecked criteria. As shown in FIG. 2, performance of the preceding operations has resulted in sections 202, 208, 214, 220, 226 and 232 being annotated checked as containing checked criteria, while section 238 has been annotated as containing unchecked criteria. Likewise, checklist sections 244 and 252 have been annotated as checklist sections that contain checked criteria, while checklist sections 248 and 256 have been annotated as checklist sections that contain unchecked criteria.

FIG. 3 shows Natural Language Processing (NLP) text that has been processed in accordance with an embodiment of the invention to identify various sections of a populated form. FIG. 4 shows unchecked criteria within the populated form of FIG. 3 that has been identified in accordance with an embodiment of the invention. In these embodiments, section identification and annotation operations, described in greater detail herein, are performed to identify and categorize sections within a target text, such as a populated form 300. As shown in FIG. 3, these operations have resulted in the identification of question sections 302, 304, 306, 308, 310 and 312.

One or more checklist sections 316, 318 and 320 are then identified within the populated form 300 by performing operations to identify trigger terms or phrases, such as "check all that apply" in the header of each checklist section. Concurrently, associated checkmarks and boxes (e.g., "_X_", "_x", "X", "_", graphical images, etc.) 322, 324 are identified, followed by operations to identify checked item and criteria scope as described in greater detail herein.

Once all checklist sections and checked criteria have been identified, remaining text spans within a checklist section are annotated as unchecked criteria. As shown in FIG. 4, the result of the preceding operations has resulted in sections 404 and 408 being annotated checked as checked criteria, while sections 402, 412 and 414 have been annotated as unchecked criteria. Likewise, checklist sections 406 and 410 have been annotated as checklist sections that contain unchecked criteria.

Figure 5:
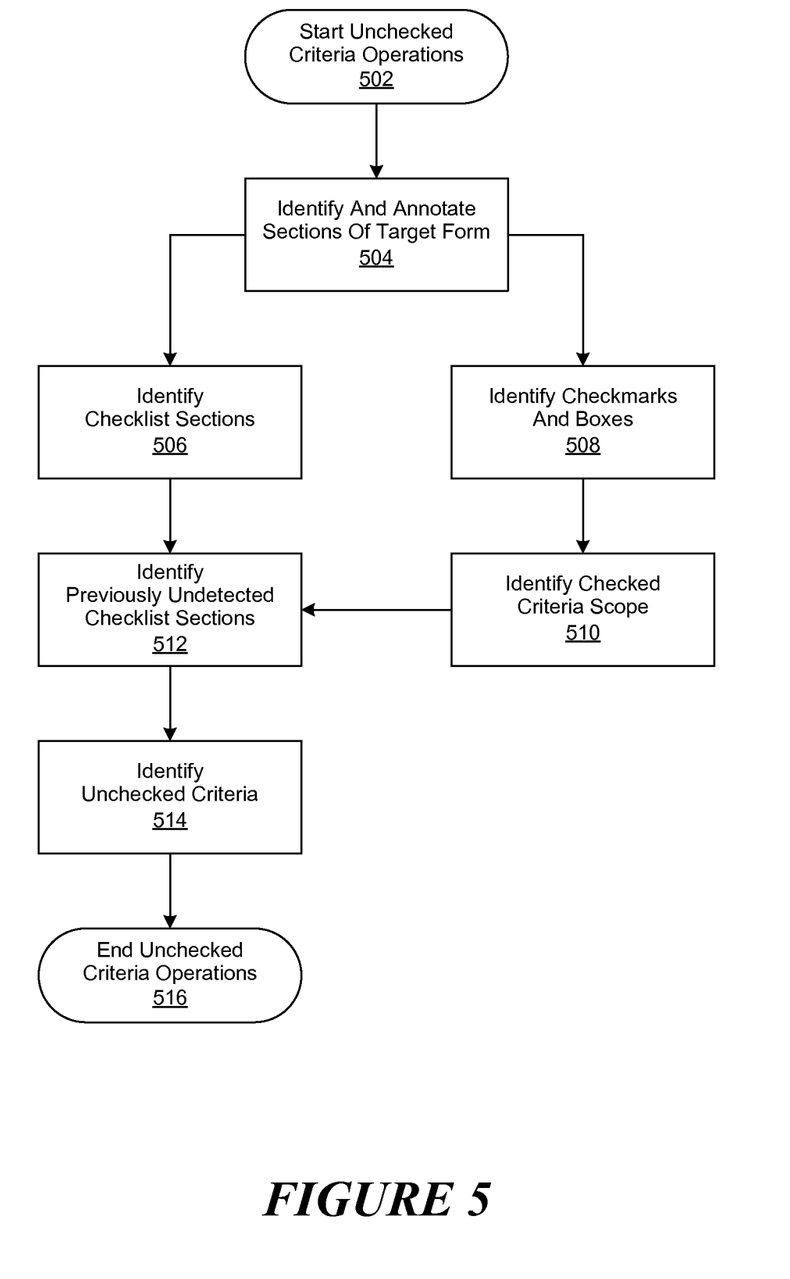
FIG. 5 shows a generalized flowchart of unchecked criteria operations performed in accordance with an embodiment of the invention.

FIG. 5 is a generalized flowchart showing unchecked criteria operations performed in accordance with an embodiment of the invention. In this embodiment, unchecked criteria operations are begun in step 502, followed by section identification and annotation operations, described in greater detail herein, being performed in step 504 to identify and categorize sections within a target document, such as a form.

Checklist sections within the target document are then identified in step 506 by performing operations to identify trigger terms or phrases, such as "check all that apply" in the header of each checklist section. Concurrently, in step 508, associated checkmarks and boxes (e.g., "_X_", "_x", "X", "_", graphical images, etc.) are identified, followed by operations being performed in step 510 to identify checked item and criteria scope as described in greater detail herein.

Once the previously-described operations are completed in step 506 and step 510, previously undetected checklist sections that lack checklist triggers in their associated checklist headers are identified in step 512. In various embodiments, a document section that had been previously identified as a non-checklist section is re-categorized as a checklist section when predetermined conditions are observed. In one embodiment, a non-checklist section is re-categorized as a checklist section if it contains a checkmark or box. In another embodiment, a previously-identified non-checklist section is combined with an identified checklist section when there is a relatively small space separating the two. Once all checklist sections and checked criteria have been identified, remaining text spans within a checklist section are annotated as unchecked criteria in step 514 and unchecked criteria operations are then ended in step 516.

Although the present invention has been described in detail, it should be understood that various changes, substitutions and alterations can be made hereto without departing from the spirit and scope of the invention as defined by the appended claims.

What is claimed is:

1. A system comprising:
a processor;
a data bus coupled to the processor; and
a computer-usable medium embodying computer program code, the computer-usable medium being coupled to the data bus, the computer program code used for identifying unchecked criteria in unstructured data within a form and comprising instructions executable by the processor and configured for:
identifying checked data in a form;
identifying a first set of unstructured data as pertinent to the checked data in the form; and,
identifying unchecked criteria in unstructured data within the form based upon the identifying the first set of unstructured data, the identifying comprising detecting and classifying text spans representing the unchecked criteria within the form to facilitate accurate interpretation of the text spans, the unchecked criteria comprising a discrete item that represents a question in the form lacking a response.

2. The system of claim 1, further comprising:
identifying a first checklist section in the form, the first checklist section containing a first set of checklist data pertinent to the checked data in the form.

3. The system of claim 2, further comprising:
re-categorizing a non-checklist section as a second checklist section based upon a criteria, the re-categorizing performed after identifying a second set of unstructured data contained in the non-checklist section as pertinent to the checked data in the form.

4. The system of claim 3, further comprising:
processing the second set of unstructured data to generate a second set of checklist data; and
associating the second set of checklist data with the second checklist section.

5. The system of claim 4, further comprising:
processing the non-checklist section, the first checklist section, and the second checklist section to identify unchecked criteria.

6. The system of claim 5, further comprising:
using a first natural language process on the non-checklist section and a second natural language process on the first and second checklist sections of the form to identify the unchecked criteria.

7. A non-transitory, computer-readable storage medium embodying computer program code, the computer program code comprising computer executable instructions configured for:
identifying checked data in a form;
identifying a first set of unstructured data as pertinent to the checked data in the form; and,
identifying unchecked criteria in unstructured data within the form based upon the identifying the first set of unstructured data, the identifying comprising detecting and classifying text spans representing the unchecked criteria within the form to facilitate accurate interpretation of the text spans, the unchecked criteria comprising a discrete item that represents a question in the form lacking a response.

8. The non-transitory, computer-readable storage medium of claim 7, further comprising:
identifying a first checklist section in the form, the first checklist section containing a first set of checklist data pertinent to the checked data in the form.

9. The non-transitory, computer-readable storage medium of claim 8, further comprising:
re-categorizing a non-checklist section as a second checklist section based upon a criteria, the re-categorizing performed after identifying a second set of unstructured data contained in the non-checklist section as pertinent to the checked data in the form.

10. The non-transitory, computer-readable storage medium of claim 9, further comprising:
processing the second set of unstructured data to generate a second set of checklist data; and
associating the second set of checklist data with the second checklist section.

11. The non-transitory, computer-readable storage medium of claim 10, further comprising:
processing the non-checklist section, the first checklist section, and the second checklist section to identify unchecked criteria.

12. The non-transitory, computer-readable storage medium of claim 11, further comprising:
using a first natural language process on the non-checklist section and a second natural language process on the first and second checklist sections of the form to identify the unchecked criteria.

13. The non-transitory, computer-readable storage medium of claim 7, wherein the computer executable instructions are deployable to a client system from a server system at a remote location.

14. The non-transitory, computer-readable storage medium of claim 7, wherein the computer executable instructions are provided by a service provider to a user on an on-demand basis.

* * * * *